United States Patent [19]
Richter

[11] 3,900,705
[45] Aug. 19, 1975

[54] DUAL DIGITAL VIDEO SWITCHER

[75] Inventor: Ian A. Richter, Cocoa Beach, Fla.

[73] Assignee: The United States of America as represented by the National Aeronautics and Space Administration Office of General Counsel-Code GP, Washington, D.C.

[22] Filed: Sept. 25, 1973

[21] Appl. No.: 400,467

[52] U.S. Cl. .............................. 178/6.8; 178/DIG. 1
[51] Int. Cl.[2] .............................. H04N 7/18
[58] Field of Search ..... 178/DIG. 38, 6, 6.8, DIG. 1

[56] References Cited

UNITED STATES PATENTS

| | | | |
|---|---|---|---|
| 3,580,998 | 5/1971 | Hammond | 178/DIG. 38 |
| 3,757,039 | 9/1973 | Brewer | 178/DIG. 38 |
| 3,767,851 | 10/1973 | Wick | 178/DIG. 38 |

*Primary Examiner*—Howard W. Britton
*Assistant Examiner*—Michael A. Masinick
*Attorney, Agent, or Firm*—James O. Harrell; John R. Manning

[57] ABSTRACT

A system for manually and automatically coupling video signals from a plurality of cameras to a monitoring apparatus. The system has a manual mode of operation, a continuous scan mode, a single scan mode and a hold condition. The scanning mode is controlled by a shift register which can be activated at various rates so as to vary the duration that a particular video signal is coupled to the monitoring apparatus. If the system is in the scan mode a push button can be depressed to hold the video signal coupled to the monitoring system until the operator desires to return to the scan cycle. Various logic circuits are utilized in the system for selecting a predetermined scanning sequence, as well as to permit the circuit to be manually operable under control of an operator.

9 Claims, 9 Drawing Figures

DUAL DIGITAL VIDEO SWITCHER

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

This invention relates to a monitoring system, and more particularly to a manually and automatically operable system for coupling a plurality of video signals to a monitoring apparatus.

In monitoring the launching of space vehicles, it has been determined that there is a need to have ready access to video signals coming from a plurality of video cameras located at various points at the launch site. It is often desired by the personnel controlling the launch to observe each ot these video signals either sequentially or upon manual selection of a particular camera. In the past, in order to observe the signals from these video cameras, normally it was necessary for the test operator to notify personnel operating the television cameras of the particular video picture that he desired to see at that time. These personnel would, in turn, manually plug in through patchboards or other selection circuits the cables associated with that particular camera. While such may be satisfactory for monitoring certain equipment, it is frequently imperative that the test conductor have immediate access to any particular television camera he desires to observe. The patchboard system made it highly impractical to continuously observe all video cameras in frequently desired changing sequences. Furthermore, it was impractical to utilize a single monitoring apparatus for each of the cameras being used.

The system constructed in accordance with the present invention enables a single monitoring system to be utilized for as many as 60 T.V. cameras, thus eliminating considerable expense, space, and manpower.

SUMMARY OF THE INVENTION

The invention includes a system for manually and automatically coupling video signals from a plurality of cameras to a monitoring apparatus. A video switching circuit having a plurality of input terminals and an output terminal is provided for receiving the video signals of all of the cameras being monitored. The monitoring apparatus is in turn coupled to the output of the video switching circuit. A manually operable pushbutton is coupled through logic circuits to the video switching circuit for selectively coupling a particular video signal to the monitoring apparatus. The system is equipped with a continuous scan mode which enables the video signals to be sequentially coupled to the monitoring apparatus according to a predetermined sequence. Means is provided for selectively controlling the duration that the video signals are coupled to the monitoring apparatus while said video signals are being sequentially coupled thereto. When it is desired to stop the scanning operation, a hold button is depressed which causes a particular video signal being monitored to be locked to the monitoring apparatus. The system can also be placed in a single scan mode and the sequence of scanning the video signals can be readily changed by manipulating a pair of thumbwheel switches. Various logic circuits, including delay circuits, flip-flops, and gating circuits are provided for obtaining the desired mode of operation.

Accordingly, it is an important object of the present invention to provide a digital video switcher which is capable of either manually or automatically connecting a particular video signal from a camera to a monitoring apparatus.

Another important object of the present invention is to provide a digital video switcher, wherein, a plurality of video cameras can be sequentially scanned and a test conductor can by merely pressing a button, interrupt the scan and lock a particular video signal to a monitoring apparatus.

Still another important object of the present invention is to provide a digital video system, which allows a single recording apparatus to make a record of all video signals rather than utilizing individual recording systems for each video camera.

Still another important object of the present invention is to provide a digital video switcher, which sequentially scans a plurality of video cameras, and the rate of scanning can be readily varied.

Another important object of the present invention is to provide a digital video switcher, which minimizes the cables required between a plurality of cameras and a monitoring system.

Another important object of the present invention is to provide a digital video switcher, which is capable of being expanded for accommodating any number of cameras.

These and other objects and advantages of the invention will become apparent upon reference to the following specification, attendant claims and drawings.

DESCRIPTION OF THE PREFERRED EMBODIMENT

Figure 1:
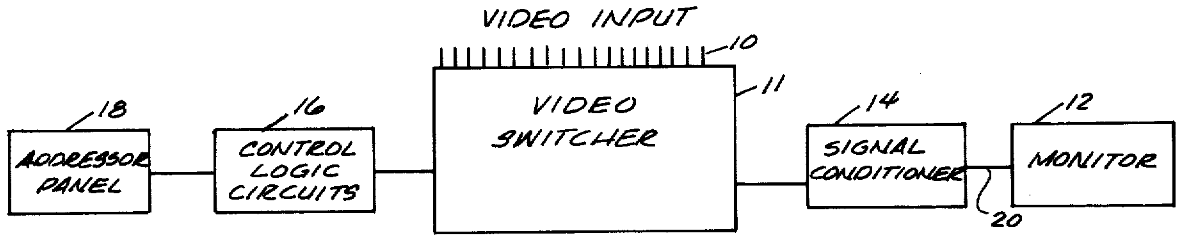
FIG. 1 is a block diagram illustrating a video switcher constructed in accordance with the present invention.

Referring in more detail to FIG. 1 of the drawings, there is illustrated a block diagram for the entire digital video switching circuit wherein, 60 input leads 10 are being fed into a plurality of video switches 11. These switches may be activated so as to couple the video signals coming in on leads 10 to a monitor 12. Connected between the monitor 12 and the video switcher 11 is a conventional signal conditioner 14, which conditions the signals coming out of the video switcher 11 so that such can be handled by the monitor 12.

The video switcher 11 includes a plurality of diode matrix switches, which will be discussed more fully below. Video switcher 11 is under control of a control logic circuit 16 which is located at an operators console. Video switcher 11 and signal conditioner 14 may be located at a remote station, and only one cable 20 is necessary to feed the signals from the signal conditioner 14 to the monitor 12 which is also located at the operator's console. The control logic circuits 16 are coupled to the addressor panel, which has lamps, push buttons, numerical display panels, and other control functions associated therewith. In particular, the addressor panel 18 has mode selections which are operated by push buttons which will enable an operator to select either manual select, continuous scan, single scan, hold, fast-scan, slow-scan, and system logic test modes.

A detailed description of the circuit will first be given by tracing a single path through the entire circuit when the test conductor desires to manually couple the video signal from a particular camera to the monitor 12. The video switcher, as shown in the drawing, is designed to accommodate 60 video signals coming from a corresponding number of cameras. However, it is to be understood that such could be readily expanded. Each of these 60 cameras and video signals are assigned a number 00 through 59, and in order to aid in understanding the operation of the circuit, first the manual selection of video signal number 27 will be described.

Figure 3:
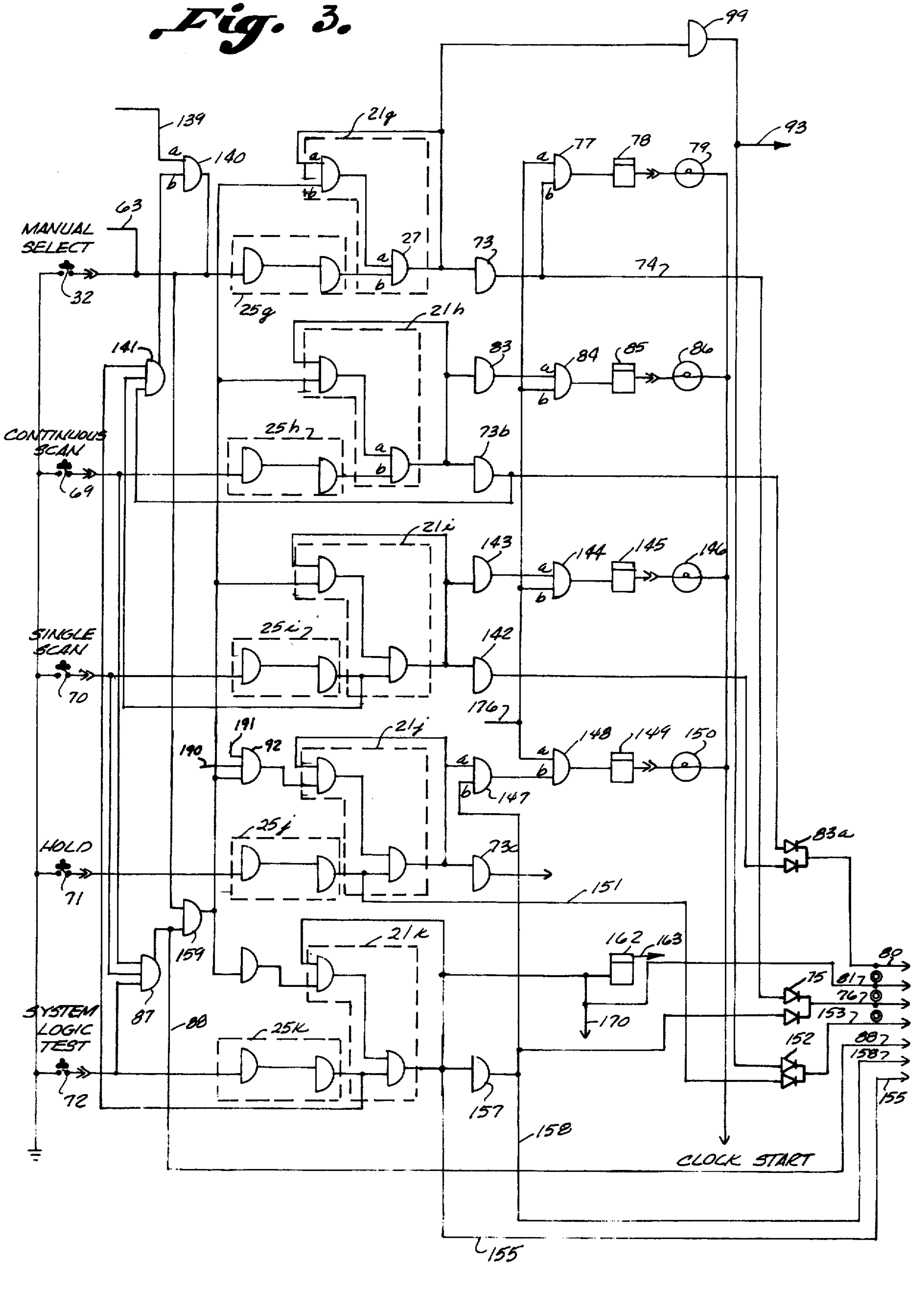
FIG. 3 is a block diagram illustrating schematically a logic diagram for selecting a particular mode for the video switcher.
Figure 4:
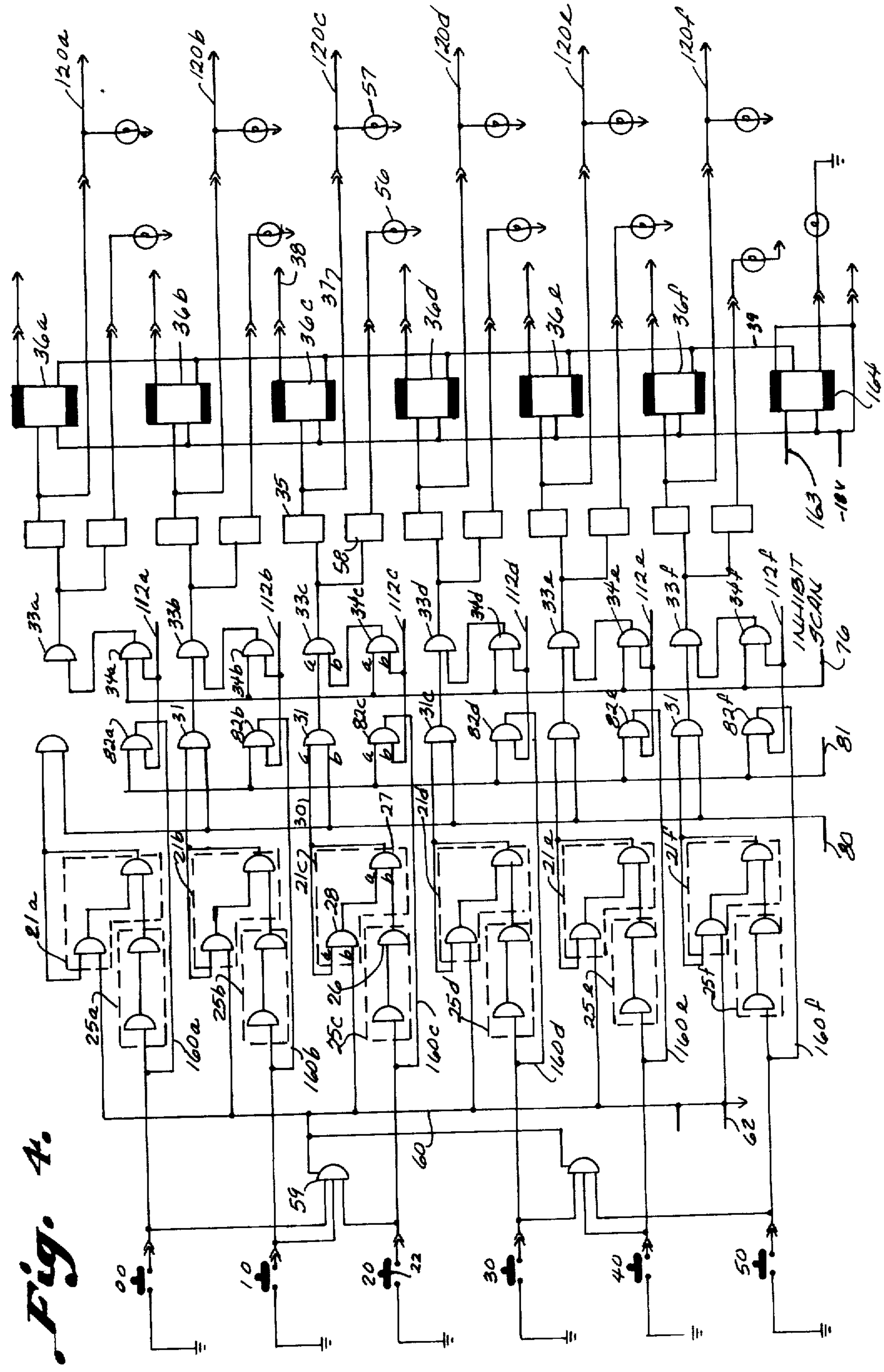
FIG. 4 is a logic diagram illustrating the circuitry utilized for selecting video signals corresponding to tens.
Figure 5:
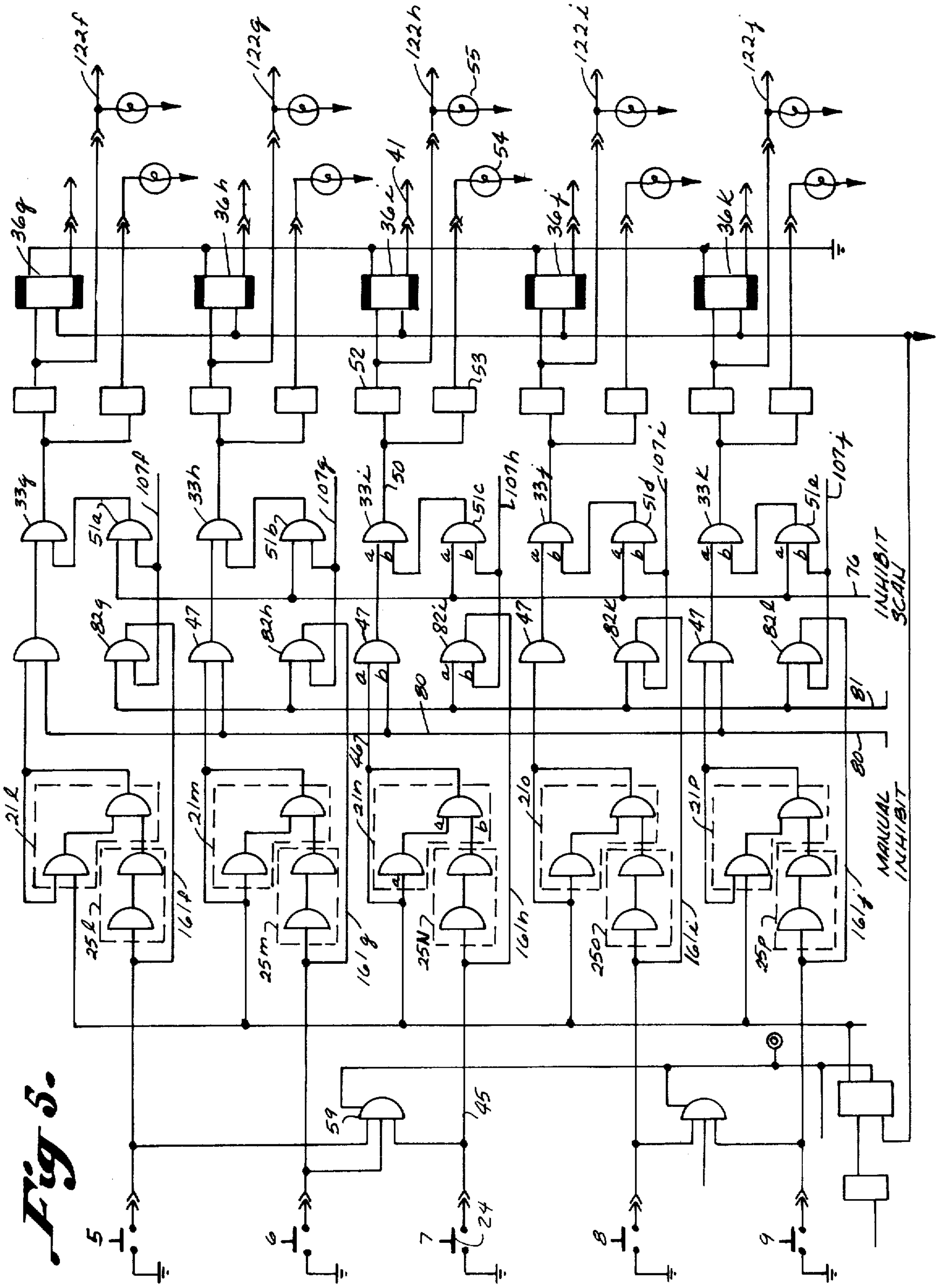
FIG. 5 is a logic diagram illustrating circuitry utilized for selecting video signals corresponding to units, FIGS. 6 and 7 when placed side-by-side is a logic diagram illustrating clock and scanning circuits used in the switching circuit, and FIGS. 8 and 9 when placed side-by-side illustrate a block diagram showing relay and diode matrices utilized in coupling a plurality of video inputs to a monitoring apparatus.

Referring in more detail to FIG. 4 of the drawings, in order to select a video signal coming from camera number 27 the operator depresses button 22, which is for the 20 series button shown in FIG. 4, as well as button 24 shown in FIG. 5, which is the seven units button. One side of the button 22 is connected to ground, whereas, the other side is fed into one input of a delay circuit 25*c* consisting of two NAND gates 26. These NAND gates provide a predetermined delay in the signal being fed to a flip-flop 21*c* consisting of NAND gates 27 and 28. The logic levels utilized throughout the circuit are a minus 6 volts representing a logic one, and zero volts representing a logic zero. Therefore, when the button 22 for the series 20 is depressed, a logic zero is fed through the delay circuit 25*c* into one input of the flip-flops 21*c* consisting of NAND gates 27 and 28. This causes the flip-flop to produce a one on output lead 30 which is fed to the *a* input of NAND gate 31. The NAND gate 31 has an *a* and *b* input. The *b* input of the NAND gate 31 is set to a logic level one by a mode logic signal coming from the circuit illustrated in FIG. 3, and particularly the signal produced by pressing the manual select button 32 shown in FIG. 3. The details of the circuit shown in FIG. 3 are discussed below.

Figure 8:
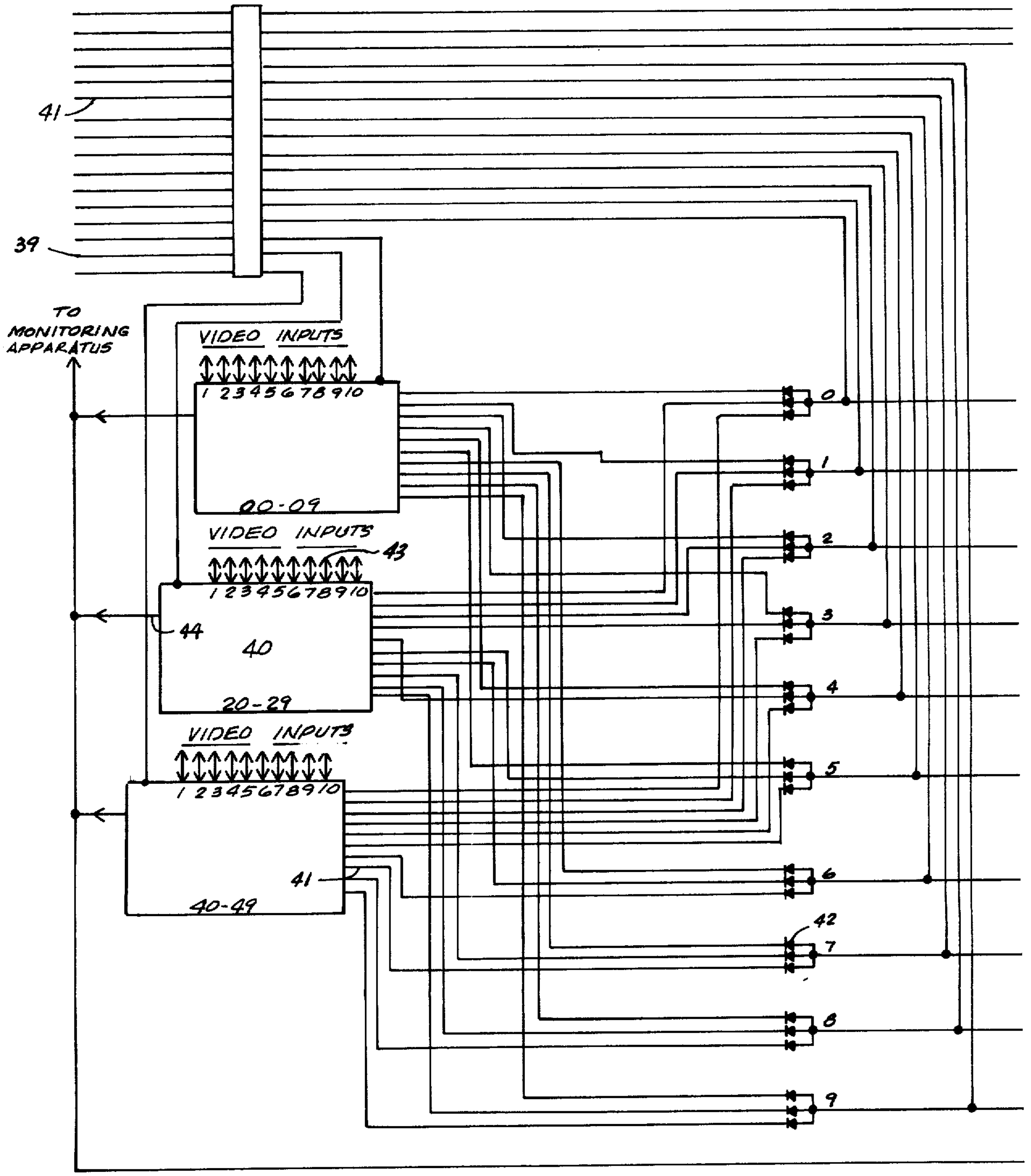
Figure 9:
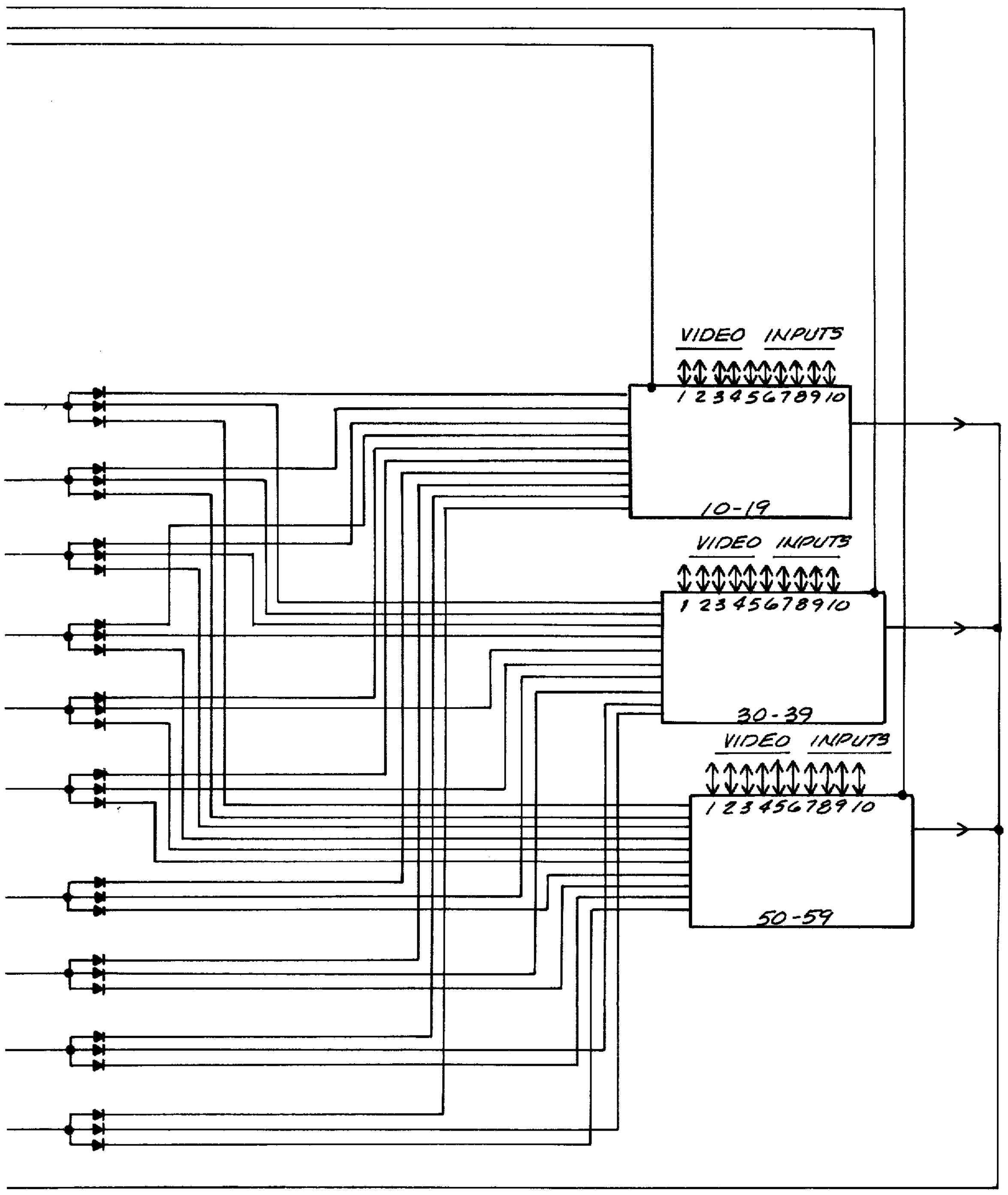

At the output of the NAND gate 31 there is a zero which is fed to the *a* input of NAND gate 33*c*. A zero logic signal is applied to the *a* input of the gate 34*c* from the mode logic circuit illustrated in FIG. 3, which in turn, causes a one to be applied to the *b* input of gate 33*c*. At the output of gate 33*c* there is a one zero logic level which is fed to lamp driver 35, which causes relay 36*c* to be energized. When relay 36*c* is energized a minus 18 volts, which is coupled to lead 37, is applied to the output lead 38. The output lead 38 is, in turn, coupled to lead 39, shown in FIG. 8, which is fed into the 20 series video matrix box 40 for enabling a selection of any one of the 10 inputs applied to that box. The other input of the 20 series box 40 is supplied by lead 41 through a diode gate 42 for selecting the unit 7. Therefore, the matrix switcher 40 is now enabled for allowing the video signals coming from the television camera number 27 over input lead 43 to be coupled through the switching circuit 40 to output lead 44, which is applied to the monitoring apparatus 12 through a conventional signal conditioner 14. The selection of the unit 7, which is necessary to select the video camera 27, is similar to that just described for selecting the 20 series. The circuit for selecting the unit 7 is disclosed in FIG. 5. Only the push buttons for the units 5 through 9 are shown, however, it is to be understood that the identical circuity is used for selecting the units 3 through 4. As previously mentioned, the unit 7 is selected by depressing the push button 24 which connects ground to the input terminal of delay circuit 25*n*. The same reference character with a different subcharacter to distinguish the particular elements will be used throughout the specification for similar components whether the component is in the circuit for selecting the units or the circuit for selecting the ten series. The logic zero signal appearing on lead 45 is fed through the delay circuit 25*n* to the *b* input of flip-flop 21*n* which operates in the identical manner as flip-flop 21*c* previously described in the ten series circuit. This causes a logic one to appear on output lead 46, which is fed into the *a* terminal of NAND gate 47. Connected to the *b* terminal of NAND gate 47 by lead 80 is a logic signal one applied by depressing the manual mode logic switch 32.

On the output of NAND gate 47 there is a logic signal zero which is fed into the *a* input of NAND gate 33*i*. The *b* input of NAND gate 33*i* is connected to the output of NAND gate 51*c* and has a logic level one applied thereto. This causes a logic level one to appear on the output lead 50 which is applied to lamp drivers 52 and 53. The lamp driver 52 causes relay 36*i* to be energized which, in turn, supplies a ground level signal to lead 41 for selecting the unit 7 in the video matrix box 40, shown in FIG. 8. The output of the lamp driver 53 is fed to the control panel for illuminating a lamp 54 representing the numerical character 7. The output of lamp driver 52 illuminates a lamp 55 carried within the push button 24, which represents the 7 unit. Similar lamps 56 and 57 are provided for the twenty series. For example, the lamp 56 is coupled to the output of lamp driver 58 for being illuminated when a signal appears on the output of NAND gate 33*c*. The lamp 57 is carried within push button 22 indicating the twenty series has been selected. This lamp is connected to the output of lamp driver 35 for being illuminated when a signal appears.

So that only one particular ten series or unit series is selected at a time when a push button, such as push button 22 associated with the twenty series is depressed, a signal is fed through a diode cluster, such as 59, shown in FIGS. 4 and 5, which causes a signal to be fed over lead 60 to the *b* input of the NAND gate 28 forming part of the flip-flop 21*c*. This resets all of the flip-flops other than the particular flip-flop associated with the push button depressed. The purpose of the delay circuit 25*c* is to insure that when the selected push button is released that the flip-flop associated with the circuit will be in a set condition. This is to prevent the simultaneous application of the reset signal coming in over lead 60 to the *b* input of the NAND gate 28 of the flop-flop 21*c* with the application of the signal to the *b* input of the NAND gate 27 of the same flip-flop. The entire system may be reset by applying a signal to lead 60, shown in FIG. 4, by merely depressing a reset button 61, shown in FIG. 7.

When reset button 61 is closed a logic zero signal is fed through diode gates 62, 63, 64 and 65, as well as to the input of NAND gate 66. The output of NAND gate 66 is connected to lamp driver 67 which causes lamp 68 to be illuminated indicating the entire system has been reset. The output of the diode gates 62 through 65 are, in turn, fed to various points throughout the circuit.

Referring now to FIG. 3, there is illustrated a circuit for selecting the particular mode desired. For example, when push button 32 is depressed the system will operate in a manual select mode. If a continuous scan mode is desired, push button 69 would be depressed. A single scan mode is selected by depressing push button 70, and a hold mode is selected by depressing push button 71. If it is desired to test the logic circuits within the system, push button 72 is depressed.

When the manual select mode push button 32 is depressed such causes a zero logic signal to be applied through the delay circuit 25*g* to the *b* input of NAND gate 27 forming part of flip-flop 21*g*. This causes a logic signal one to be applied to the input of NAND gate 73*a* which, in turn, causes a logic zero to be applied to lead 74. This logic zero signal is fed through a diode cluster 75 to line 76, which is in turn, connected to the *a* input of NAND gate 34*a* through 34*f*, shown in FIG. 4, as well as to the *a* input of NAND gates 51*a* through 51*e* of the unit selection circuit illustrated in FIG. 5 for inhibiting the scan mode.

The output of NAND gate 73*a* also, goes to the *b* input of NAND gate 77, which turns on lamp driver 78 for illuminating the lamp 79 contained within switch 32 indicating that the manual select switch 32 has been depressed. When the manual select mode is selected a logic level one signal appears on line 80 permitting activation of NAND gate 31, shown in FIG. 4. This same logic level one is applied to the *b* input of NAND gate 47, shown in FIG. 5. Similarly, a logic level zero appears on line 81, which is fed to system inhibit gates 82*a* through 82*f*, shown in FIGS. 4 and 5, the purpose of which will be discussed later when describing the modes of operation.

If it is desired to select the continuous scan mode push button 69 is depressed. This causes a logic level zero to be applied through the delay network 25*h*, shown in FIG. 3, to one input of flip-flop 21*h*. This, in turn, causes a logic level one to be applied to the input of NAND gate 73*b*, which in turn, applies a logic level zero to the input of diode cluster 83*a*. The logic level zero passes through the diode cluster 83*a* over lead 80 to provide a manual select inhibit signal that is fed to the *b* inputs of gates 31, shown in FIG. 4, and to the *b* input of NAND gates 47, shown in FIG. 5. Flip-flop 21*h* also supplies a logic level one to the NAND gate 83, which in turn, causes a logic level zero to be applied to the input of NAND gate 84. This causes lamp driver 85 to energize 86 contained within the push button 69 indicating a continuous scan mode.

When the continuous scan push button 69 is depressed a zero is applied to diode cluster 87 whose output is connected to line 88. A zero on line 88 causes a zero to be fed into diode cluster 89, shown in FIG. 6, which sets flip-flop 90 to start clock 91. The clock 91 is a hundred kilocycle oscillator, which has its output connected to a binary counter consisting of flip-flops 92*a* through 92*t*. These series connected flip-flops 92*a* through 92*t* provide clock speeds for operating the scan cycle.

Figure 6:
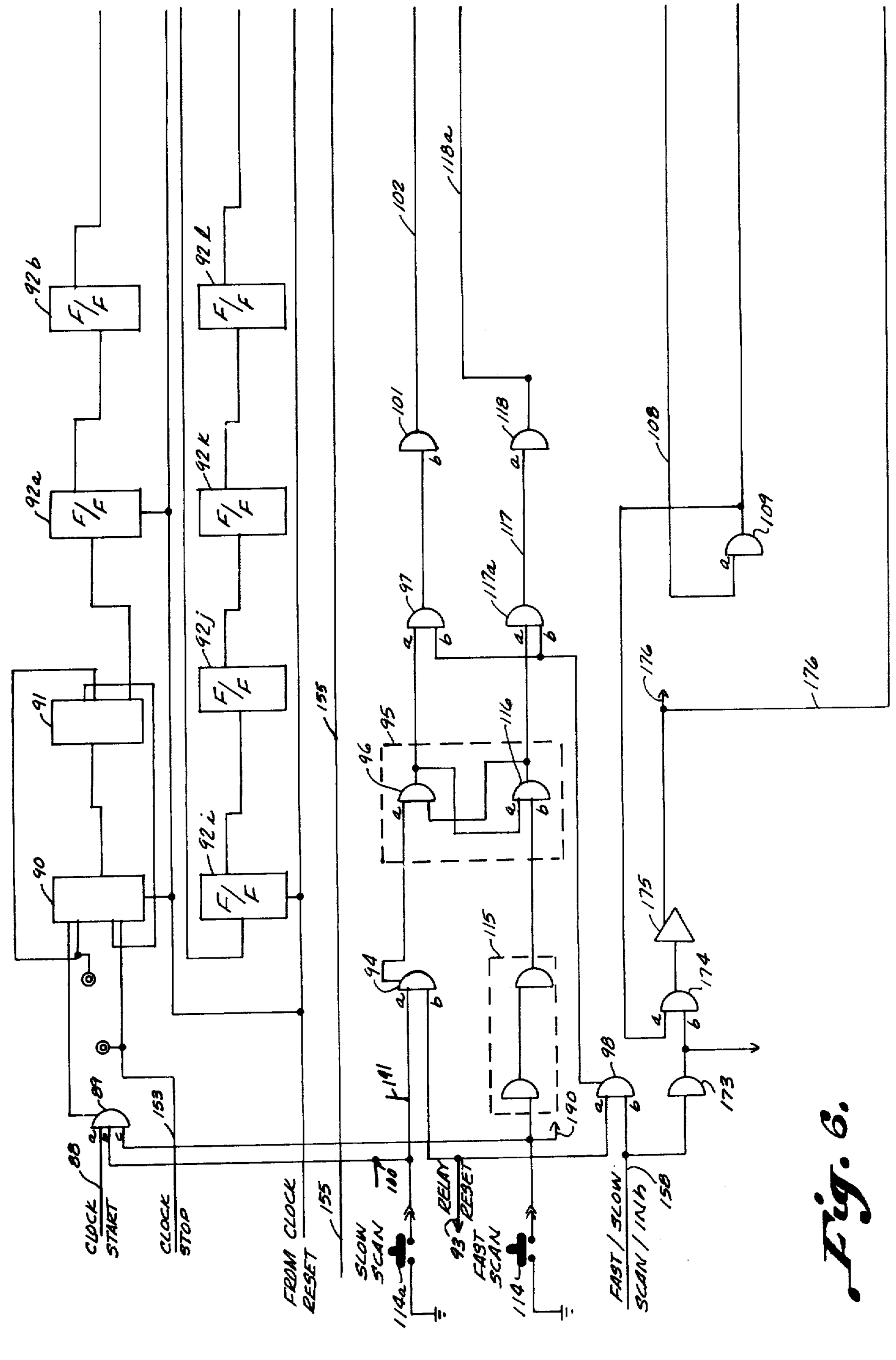

When the system is initially changed from manual to the continuous scan mode a zero is applied momentarily to lead 93, shown in FIG. 6, from lead 93 shown in Figure , which places a logic level zero at the input of diode cluster 94 setting flip-flop 95 by applying a zero level input signal to the *a* terminal of NAND gate 96. A logic level one appears on the output of NAND gate 96 which is applied to the *a* input of NAND gate 97. The *b* input of NAND gate 97 also has a logic level one applied thereto, which is received from diode cluster 98. It should be noted that the logic level zero at 93 was only momentary and is now at a logic level one. The reason for this is that as soon as the mode was switched from manual select to continuous scan NAND gate 99 rose to a logic level one by the resetting of flip-flop 21*g*, shown in FIG. 3.

At this time line 93 is at a one, hence the output of NAND gate 97 is at a zero, which will put a logic one on line 102 coupled to the output of NAND gate 101. This logic level one on line 102 is fed to the input of NAND gate 103, shown in FIG. 7, thus allowing the slow scan speed from the last stage 92*t* of the counter to be fed through diode cluster gate 104 to the shift input lead 104*a* of the unit shift register 105. The circuit is such that flip-flop 106 will initially shift a one into the zero input of the unit shift register 105. As soon as the shift register is shifted one digit, flip-flop 106 is reset. When the shift register 106 is shifted nine times, the one at the output of the last stage 107*j* resets flip-flop 106 so that once again another one will be shifted down the register.

Logic level ones sequentially appear at the outputs of the various stages of the shift register 105 labeled 107*a* through 107*j* will sequentially enable gates 51*a* through 51*e* of the unit circuit illustrated in FIG. 5. As the gates 51*a* through 51*e* are sequentiallly enabled, a one appears on the output of NAND gate 33*g* through 33*k* for energizing relays 36*g* through 36*k*, as well as the lamps associated therewith. Each time the shift register 105 produces a one on the output of flip-flop 107*a*, such is fed over lead 108 to an input of NAND gate 109. The output of NAND gate 109 is coupled to the shift input of the ten shift register 110 for causing such to shift one unit. In the same manner as flip-flop 106, flip-flop 111, forming part of the ten shift register 110, causes a one to be shifted down the register appearing on lines 112*a* through 112*f*. These signals are used for enabling the NAND gates 34*a* through 34*f*, forming part of the ten circuit illustrated in FIG. 4 for subsequentially sequentially energizing the relays 36*a* through 36*f* similar to the energization of relays 36*g* through 36*k*, shown in FIG. 5. In this manner the video relays are sequentially activated for sequentially applying the video picture to the monitoring apparatus when in the scan mode.

Push button 114, shown in FIG. 6, is provided for activating the fast scan mode. When push button 114 is depressed a zero is applied through delay network 115 causing a zero to appear on the output of flip-flop 95. This causes a one to appear on the output of NAND gate 118, which is fed to the *b* input of NAND gate 119 over lead 118*a*. When a one is applied to the *b* input of NAND gate 119 such permits a fast scan pulse appearing on the output of flip-flop 92*s* to be fed to the input of diode cluster 104, thus doubling the speed of the shift pulses being applied to the shift register 105 and subsequently the ten shift register 110.

Figure 2:
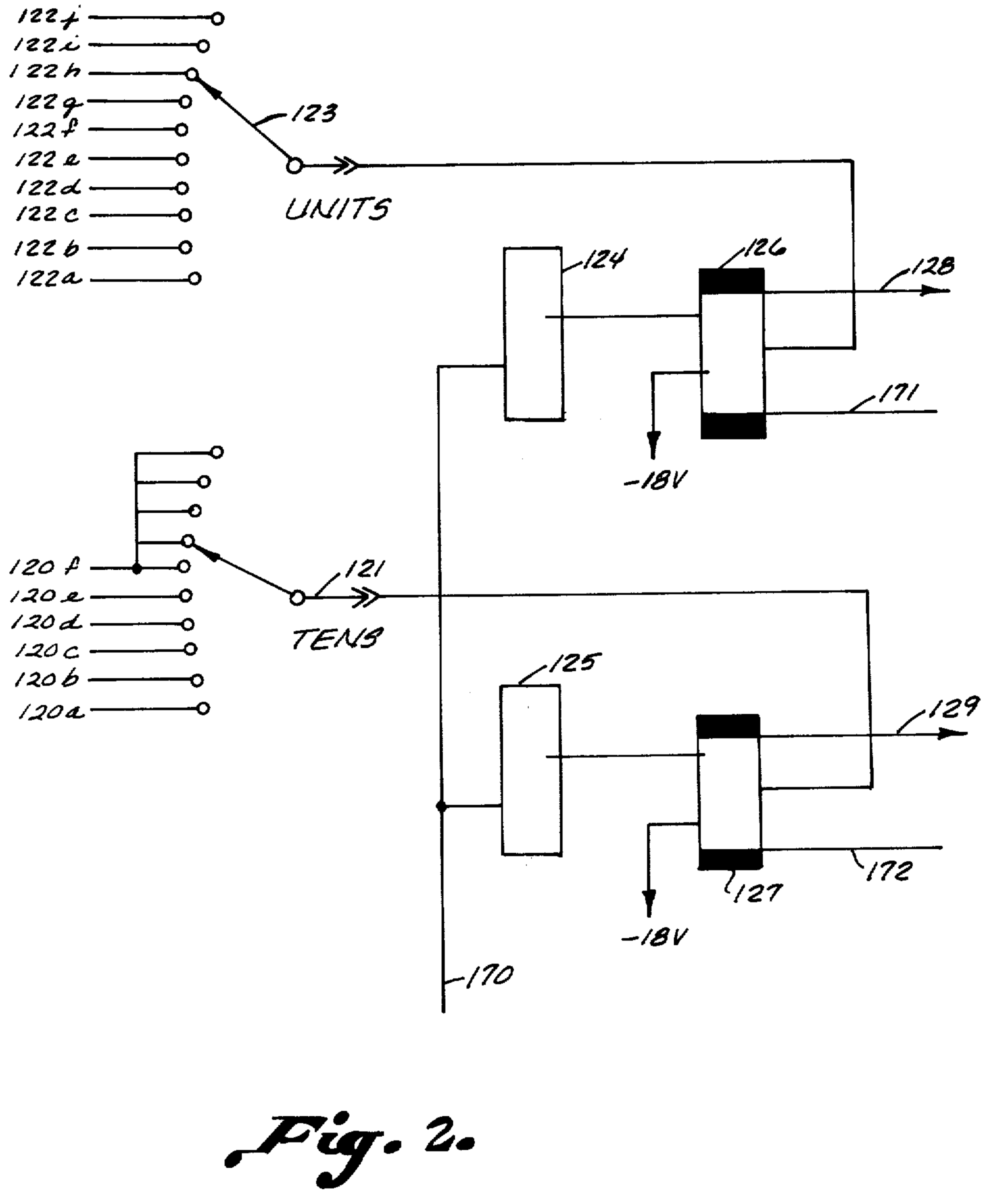
FIG. 2 is a schematic diagram illustrating thumbwheel switches for selecting the sequence of coupling video signals to the monitoring apparatus.

The lines 120*a* through 120*f*, shown in FIG. 4 are fed to the ten thumbwheel switch 121, shown in FIG. 2. In the same manner leads 122*a* through 122*j*, shown in FIG. 5 are coupled to the input of the unit thumbwheel switch 123.

When in either of the scan modes lamp drivers 124 and 125 cause relays 126 and 127 of FIG. 2 to connect the outputs of the thumbwheel switches 123 and 121, respectively, to lines 128 and 129, respectively. When the unit that is selected on thumbwheel switch is reached a zero will appear on line 128 of FIG. 2, which is inverted by NAND gate 130 of FIG. 7. The output of NAND gate 130 is fed into gate 131, which produces a zero that is fed into NAND gate 132. The NAND gate 132 inverts the logic level zero and produces a logic level one which is applied to the *a* input of NAND gate 133.

When the tens unit that is selected on thumbwheel switch 121 has been reached, a zero appears on line 129 of FIG. 2. This zero logic level is inverted by NAND gate 134, shown in FIG. 7, and fed to the input of NAND gate 135. NAND gates 135 and 136 produce a momentary delay and feed a logic level one into the *b* input of NAND gate 133. The output of NAND gate 133 in turn, drives a non-inverting amplifier 137*a*. The output of non-inverting amplifier 137*a* resets both the tens and unit shift register 105 and 110 through lines 137*b* and 137*c*, respectively. This same signal is inverted by NAND gate 137 and fed through diode gate 138 by means of line 139 shown in FIGS. 7 and 3 to the *a* input of NAND gate 140. When in the continuous scan mode, the *b* input of NAND gate 140 is at a zero level, which is derived from the output of NAND gate 73*b* and diode coupled through the diode gate 141. This is to prevent the system from going to the manual mode when a continuous scan mode is selected.

When a single scan mode is selected by depressing push button 70 a zero is applied through delay circuit 25*i* thus, setting flip-flop 21*i*. The output of flip-flop 21*i* is coupled through NAND gate 142 and diode gate 83*a* to present a manual select inhibiting signal on line 80. Thus, when a single scan mode is selected a zero will appear on line 80 inhibiting hte manual select. Also, when the single scan mode is selected, by depressing push button 70, a zero will be applied to diode cluster 87 thus putting a zero on line 88, which starts the clock. When in the single scan mode the continuous scan flip-flop 21*i* is reset. A logic level one appears at the output of NAND gate 73*b*, which is coupled through the diode gate 141 to the input of NAND gate 140. Hence, when in the single scan mode a one will appear at the *b* input of gate 140. Thus, when the end of the scan point is reached, the logic one level, which is produced on line 139 will cause a zero at the output of NAND gate 140 and put the system in the manual select mode. In this manner, once a single scan has been accomplished, the system automatically reverts back to manual select mode and displays a video signal from the camera that was selected before going into the scan mode. It should be noted that by depressing the manual select mode the system will go immediately out of any scan mode to manual.

NAND gates 143 and 144 drives lamp drivers 145, which cause lamp 146 contained within push button 70, to be illuminated.

When the hold button 71 is depressed a zero is placed through the delay circuit 25*j* into the flip-flop 21*j*. The output of the flip-flop 21*j* goes to the *a* input of NAND gate 147. The output of NAND gate 147 is connected to the *b* input of NAND gate 148 which drives lamp driver 149 illuminating the hold lamp 150 contained within push button 71. When push button 71 is depressed the logic level zero appears on line 151, which is diode coupled to diode 152 shown in FIG. 3, and causes a clock stop zero logic signal to appear on line 153 of FIG. 6. It should alos be noted that when the manual select switch 32 is depressed a logic level zero appears on the output of NAND gate 99, shown in FIG. 3. This logic level zero is diode coupled to diode cluster 152 that places a logic level zero on line 153, shown in FIG. 6, also stopping the clock.

When the system test logic push button 72 is depressed a logic level zero appears at the output of delay circuit 25*k* thus setting flip-flop 21*k*. The output of flip-flop 21*k* is fed over line 155, which allows gate 156 to supply a system test clock signal derived from counter 92*p* to be fed through diode cluster 104 into the shift register 105 to rapidly scan all of the scanning flip-flops 107*a* through 107*j*. The output of the flip-flop 21*k*, shown in FIG. 3, also goes to the input of NAND gate 157. The output of NAND gate 157 goes through line 158, shown in FIG. 6, through diode cluster 98 to inhibit the fast and scan modes by applying zero logic level signals to NAND gates 103 and 119 of FIG. 7.

The output of flip-flop 21*k* also places a logic level one on line 81, which enables the NAND gates 82*a* through 82*f* shown in FIG. 4. It should be noted that lines 112*a* through 112*f* are coupled to the *b* inputs of NAND gates 82*a* through 82*f*. Thus, when in the system logic test mode, the sequentially appearing logic level ones on lines 112*a* through 112*f* cause sequentially appearing logic level zeros to appear on lines 160*a* through 160*f* of FIG. 4. This sequentially appearing logic level zero on lines 160*a* through 160*f* rapidly simulates depressing of the tens push buttons thus, checking the tens logic system. In the same manner, when line 81 is at a one logic level, the sequentially appearing logic level one on lines 107*a* through 107*j* cause NAND gates 82*g* through 82 "1", in FIG. 5, to provide a sequentially appearing logic level zeros on lines 161*f* through 161*j*. In this manner a rapidly depressing of the push buttons associated with the units is simulated, thus testing the unit logic circuit.

A logic level one at the output of the system logic test flip-flop 21*k* also activates lamp driver 162, which places a logic level zero on line 163 of FIG. 3, which enables relay 164 to open a minus 18 volt feed to lines 39 of FIG. 4. Hence, when in the logic test mode the video display is disenabled. Also, when the system logic test flip-flop 21*k* is set a logic level one is applied on line 170 of FIG. 2. This logic level one activates lamp drivers 124 and 125 which disenables thumbwheel unit switches and gets a reset signal from lines 171 and 172 of FIG. 7. In this manner the scanner will scan through all positions instead of stopping where the thumbwheel switches are set.

When the system logic test mode line 158 is at zero logic level such causes NAND gate 173, shown in FIG. 6 to invert this logic level zero to a logic level one and to feed such into the *b* input of diode 174. The *a* input of diode 174 is connected to the output of NAND gate 109. When in the logic test mode line 108 is rapidly pulsing and thus, causes the *a* input of diode 174 to be pulsing as well. The output of diode 174 is connected to the input of a power amplifier 175. The output of power amplifier 175 is coupled through line 176 to an input of NAND gates 77, 84, 144 and 148, shown in FIG. 3. This pulsing signal causes the manual select, the continuous scan, the single scan, and hold lamp to flash during the system logic test mode.

Figure 7:
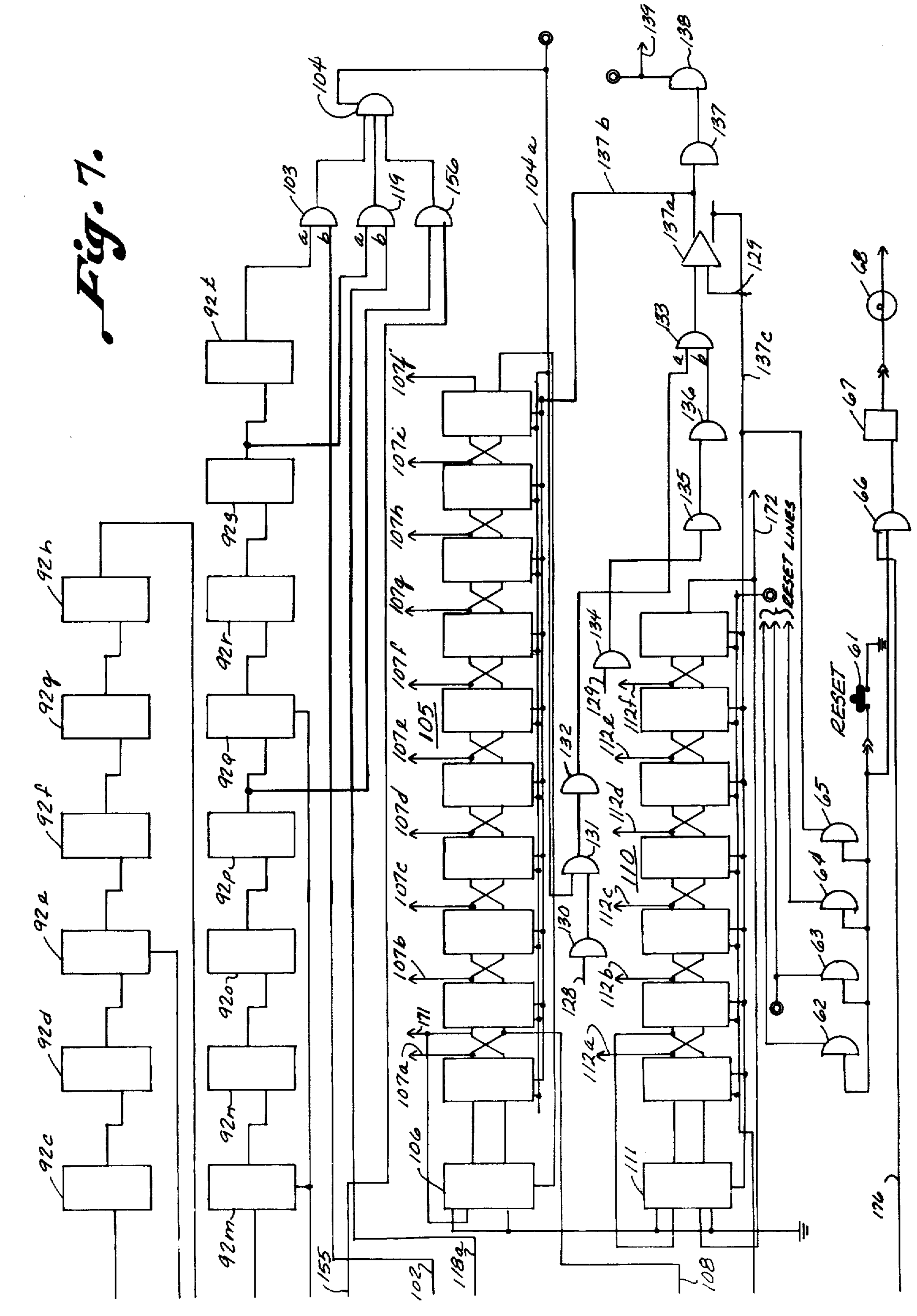

The same signal appearing on lead 176 of FIG. 6 is also fed to the *a* input of NAND gate 66, shown in FIG. 7, which drives lamp driver 67 causing the reset lamp 68 to flash as well.

Diode clusters 87 and 141, as well as 159 are arranged so that when a mode is selected all other modes are reset.

When the reset button 61, shown in FIG. 7 is depressed a zero potential is diode coupled through diode cluster 62 to a reset lead for resetting the tens logic. At the same time a zero potential is also diode coupled through diode cluster 63 which resets the mode logic to the manual select state. The depressing of the reset button 61 causes a zero potential to be diode coupled through diode cluster 64 for resetting the counters and stopping the clock. This zero potential is also diode coupled through diode cluster 65 for resetting the shift registers. In other words, the circuit is wired so that the entire system can be reset by depressing the reset button 61.

When the system is in the hold mode by depressing push button 71, shown in FIG. 3, the depressing of the slow scan or fast scan push buttons 114 and 114*a* supplies a zero on lines 190 and 191, which places a logic level zero into diode cluster 92 which, in turn, resets the hold flip-flop 21*k* thus extinguishing the hold lamp 150. It should also be noted that when either fast scan or slow scan push buttons 114 and 114*a* are depressed a clock start pulse is fed through diode cluster 89 to restart the clock.

While a preferred embodiment of the invention has been described using specific terms, such description is for illustrative purposes only, and it is to be understood that changes and variations may be made without departing from the spirit or scope of the following claims.

What is claimed is:

1. a system for manually and automatically coupling video signals from a plurality of cameras to a monitoring apparatus comprising:

a. a video switching circuit, b. means for coupling said plurality of video signals to said video switching circuit, c. means for coupling said monitoring apparatus to said switching circuit, d. manual select means coupled to said video switching circuit for manually selecting the coupling of a predetermined video signal to said monitoring apparatus, e. scanning means activating said video switching circuit for sequentially coupling said video signals to said monitoring apparatus, and f. means for selectively controlling the duration that said video signals are coupled to said monitoring apparatus as said video signals are sequentially coupled to said monitoring apparatus, and g. said means for selectively controlling the duration that said video signal are coupled to said monitoring apparatus includes i. a shift register ii. means for selectively triggering said shift register for producing pulses at a first and second rate for selectively controlling the duration that said video signals are coupled to said monitoring apparatus, whereby a plurality of video signals can be monitored both manually and automatically sequentially with the duration that said video signals are coupled to said monitoring apparatus being selectively controlled.

2. The system as set forth in claim 1 further comprising:

a. thumbwheel switches for selectively controlling the sequence that said video signals are coupled to said monitoring apparatus.

3. The system as set forth in claim 1 further comprising:

a. means for interrupting said scanning means and coupling a selected video signal to said monitoring apparatus.

4. The system as set forth in claim 1 wherein, said manual select means includes:

a. a plurality of logic circuits, b. each of said logic circuits including, i. a delay circuit, ii. a flip-flop coupled to said delay circuit, and iii. a first gating circuit, c. means for supplying a signal to said logic circuits for resetting said flip-flops, d. means for supplying said signal to said delay circuit of a selected one of said logic circuits for setting said flip-flop of said selected logic circuit, and e. said first gating circuit of said selected one of said logic circuits coupling said set flip-flop to said video switching circuit for coupling a particular video signal to said monitoring apparatus.

5. The system as set forth in claim 4 further comprising:

a. means for supplying a signal to said first gating circuit in each logic circuit for disabling said first gates for preventing manually connecting a predetermined video signal to said monitoring apparatus.

6. The system as set forth in claim 4 further comprising:

a. a second gating circuit in each logic circuit coupled to an output of said first gating circuit in said logic circuit, and b. means activated by said scanning means for sequentially activating said second gating circuits for sequentially coupling said video signals to said monitoring apparatus.

7. The system as set forth in claim 6 wherein, said scanning means activating said video switching circuit for sequentially coupling said video signals to said monitoring apparatus includes:

a. a shift register having a plurality of parallel outputs, b. means for coupling said parallel outputs to said respective second gating circuits, and c. means for sequentially generating signals on said parallel outputs of said shift register for sequentially enabling said second gating circuits.

8. The system as set forth in claim 7, wherein said means for selectively controlling the duration that said video signals are coupled to said monitoring apparatus includes:

a. a clock having a plurality of stages, and b. means for selectively coupling said shift register to stages of said clock for varying the rate that said signals are sequentially generated on said parallel outputs.

9. The system as set forth in claim 8 wherein, said means for interrupting said scanning means includes:

a. a push button, and b. circuit means coupled to said push button for stopping said clock when said push button is depressed.

* * * * *